W. F. KIESEL, Jr.
THIRD SUSPENSION FOR BRAKE BEAMS.
APPLICATION FILED JAN. 7, 1911.
Patented July 11, 1911.
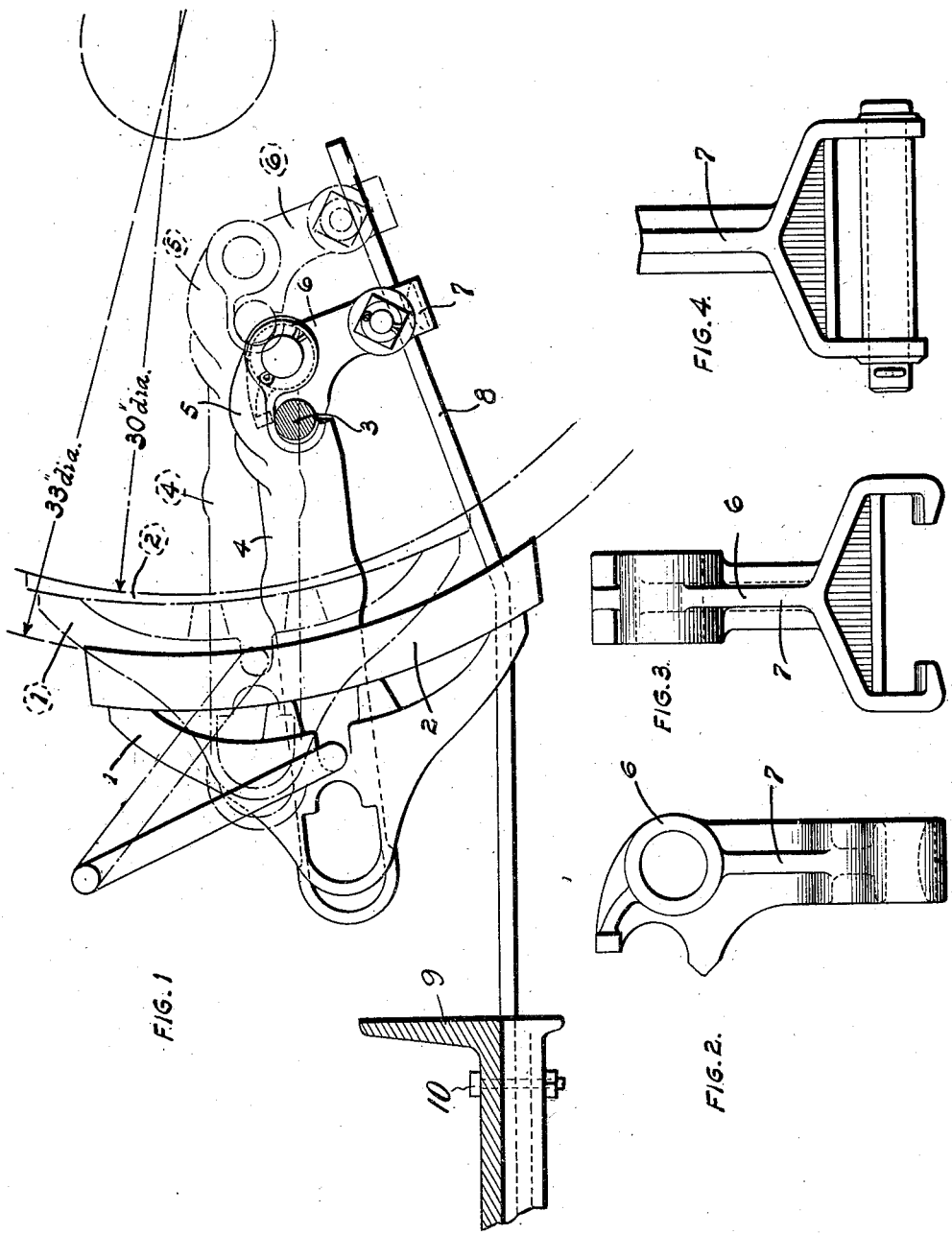
WITNESSES
INVENTOR
W. F. KIESEL JR.

UNITED STATES PATENT OFFICE.

WILLIAM F. KIESEL, JR., OF ALTOONA, PENNSYLVANIA, ASSIGNOR TO THE CHICAGO RAILWAY EQUIPMENT COMPANY, OF CHICAGO, ILLINOIS, A CORPORATION.

THIRD SUSPENSION FOR BRAKE-BEAMS.

997,922.  Specification of Letters Patent.  Patented July 11, 1911.

Application filed January 7, 1911. Serial No. 601,491.

*To all whom it may concern:*

Be it known that I, WILLIAM F. KIESEL, Jr., a citizen of the United States, residing at Altoona, Pennsylvania, have invented a certain new and useful Improvement in Third Suspensions for Brake-Beams, of which the following is a full, clear, and exact description, such as will enable others skilled in the art to which it appertains to make and use the same, reference being had to the accompanying drawings, forming part of this specification, in which—

Figure 1 is a side elevational view of my improved brake beam suspension. Fig. 2 is a similar view of a modified form. Fig. 3 is an end elevational view of the structure shown in Fig. 2. Fig. 4 is a detail view of another modified form.

This invention relates to a new and useful improvement in brake beam suspensions, and particularly to what is known as the third suspension support for brake beams.

In the present practice, railroads are using forged or rolled steel wheels, which are capable of being turned down in the truing operation so that their diameter is reduced. Ordinarily, these wheels are made thirty three inches in diameter and may be turned down to thirty inches in diameter. This reduction in the diameter of the wheel materially affects the brake beam, and particularly with relation to the suspension spring.

The present invention consists in providing the inner end of the strut of a trussed beam with a carrier, preferably arranged at an obtuse angle to the edges of the strut and having a support whereby it is maintained in proper relation to the inclined track or third suspension spring, which latter is secured to the spring plank or part of the truck frame.

In the drawings, Fig. 1 shows in full lines the position of the brake beam when used with a new shoe on a wheel thirty three inches in diameter, and in dotted lines the position of said beam and hanger when the shoe is worn and the diameter of the wheel reduced to thirty inches. This drawing clearly illustrates how the beam is not only thrown forward but upward by the reduced diameter of the wheel and the wearing of the shoe, the brake shoe being thus properly applied to the wheel in all gradations of this wearing and wheel reduction. The carrier forming the supporting element for the inner end of the strut is preferably made separate from the strut, although it may be cast integral therewith. By being made separately, it can be made for holding the center of the beam without change in the strut casting.

My invention is intended to be used in connection with standard types of brake beams, which require no change or modification, and with respect to which the usual hangers as shown in Fig. 1, may be employed. The hanger $a$, which is usually connected to the brake head swings inwardly and upwardly to cause the brake to move in an arc of a circle. On the application of the brakes the shoe or carrier will ride upwardly and cause the inner end of the brake beam to likewise move inwardly and upwardly, thus maintaining substantially parallelism or concurrence with the action of the brake beam.

In the drawings, 1 indicates the head of a brake beam and 2 the shoe thereof.

3 is the tension member and 4 the strut, which latter is provided with a nose or extension 5 of any desired form for the third suspension arrangement. In this nose or extension is mounted a carrier 6 having a leg or support 7 provided with suitable openings, through which the inclined track 8 of the third suspension spring passes. This track support is preferably secured to the spring-plank 9 of the truck by means of a bolt (or bolts) 10 and may extend on each side thereof to coöperate with both brake beams, or separate track supports may be employed if desired.

The shoe or support may be constructed with a removable lower connecting member arranged between the legs thereof, as shown in Fig. 4, which member, when removed, will enable the brake beam to be hung and unhung without moving the third suspension track. This lower member, as shown in Fig. 1, is integral providing an opening therebetween and the supporting member for the passage of the third suspension track.

In Figs. 2 and 3 the lower member is made in the form of short lugs, and in Fig. 4 an anti-friction sleeve is illustrated.

What I claim is:

1. In a third suspension for brake beams, the combination of an inclined track, a brake beam, and a carrier on the end of the brake lever post or strut of said beam for coöperating with said track.

2. In a third suspension for brake beams, a yielding support having an inclined portion, a brake beam, and a carrier on the brake beam coöperating with said inclined portion.

3. In a third suspension for brake beams, the combination of a track support having an inclined portion, a brake beam, and a carrier on said brake beam coöperating with said inclined portion.

4. In a third suspension for brake beams, the combination of an inclined track support, a brake beam, and a carrier removably mounted on the brake beam for coöperating with said support.

5. In a third suspension for brake beams, the combination of a support, in the form of a spring, having an inclined portion, a brake beam, and a carrier mounted on said brake beam, and having a surface for coöperating with said support, said carrier having portions extending on each side of said support.

6. In a third suspension for brake beams, the combination of a truck, a third suspension spring secured thereto and having its free end inclined upwardly, a brake beam, and a carrier on said brake beam coöperating with the bent end of said spring.

7. In a third suspension for brake beams, the combination of an inclined track support, a brake beam, and a carrier mounted on said brake beam, and having a removable part, whereby said carrier may be disconnected from the support.

8. The combination of a brake beam, a hanger for supporting the same, and an inclined track guide for maintaining substantial parallelism in the movement of the beam when the brakes are applied.

9. The combination of a brake beam, of pivoted brake hangers, for supporting one portion thereof, and a supporting-track for guiding the other portion of the beam, whereby the position of the beam with respect to the wheel is substantially maintained during the application of the brakes.

10. The combination of a brake beam, hangers therefor, and an inclined supporting track forming a yielding third suspension spring for guiding the beam in its brake applying movement.

11. The combination of a brake beam, hangers therefor, an inclined supporting track forming a third suspension member, and a carrier carried by the brake beam and coöperating with said third suspension member, whereby the beam is guided in its brake applying movement.

12. A carrier for brake beams, said carrier having means for attachment to the beam, and means for coöperating with a supporting track forming a third suspension support.

13. A third suspension supporting track for brake beams having means for attachment to a car truck and an inclined end for supporting the beam.

14. A third suspension spring for brake beams having means for attachment to a car truck at one end, the opposite or free end of said spring being inclined upwardly.

In testimony whereof I hereunto affix my signature in the presence of two witnesses, this 9th day of December, 1910.

WILLIAM F. KIESEL, Jr.

Witnesses:
   E. T. WALKER,
   C. H. WILLIAMS, Jr.